United States Patent [19]

Hunter

[11] Patent Number: 4,725,826

[45] Date of Patent: Feb. 16, 1988

[54] MANIPULATOR GRIP SLIP SENSOR

[76] Inventor: Bryan D. Hunter, 1721 Autumn La., Lansing, Mich. 48912-4503

[21] Appl. No.: 4,076

[22] Filed: Jan. 16, 1987

[51] Int. Cl.$^4$ .............................................. G08B 21/00
[52] U.S. Cl. ..................................... 340/679; 294/907
[58] Field of Search .............. 340/679, 686, 540, 674, 340/407; 901/46–47, 32, 33, 35, 39; 294/907, 106

[56]  References Cited

U.S. PATENT DOCUMENTS 3,171,549  3/1965  Orloff ............................. 294/106 X
3,904,234  9/1975  Hill et al. ............................ 294/106

Primary Examiner—James L. Rowland
Assistant Examiner—Thomas J. Mullen, Jr.
Attorney, Agent, or Firm—Lyman R. Lyon

[57]  ABSTRACT

An optical-electromechanical transducer to warn of slippage of a workpiece clamped within the manipulator grips of a robot.

4 Claims, 2 Drawing Figures

MANIPULATOR GRIP SLIP SENSOR

BACKGROUND OF THE INVENTION

The invention relates to an optical-electromechanical transducer to monitor workpiece motion relative to the grip surface of a robot manipulator.

The sensor assembly of the instant invention is an improvement over the "Manipulator with Electro-Mechanical Transducer Means" disclosed in U.S. Pat. No. 3,171,549 issued Mar. 2, 1965, and the "Material Handling Apparatus" disclosed in U.S. Pat. No. 3,904,234 issued Sept. 9, 1975. While a slip sensor constructed in accordance with the teachings of these patents serves a useful purpose, it is not suitable for use in applications demanding decreased transducer assembly size and weight, increased sensitivity, and increased resistance to failure upon introduction of minute foreign particles into the sensor environment.

Specifically, the sensor disclosed in the "549" patent comprises a large number of elements, including a piston encompassing a plurality of solid contiguously coupled spheres, substantially increasing the overall size and weight of the assembly. The diameter of both driving and driven spheres must be small in comparison to the overall size of the sensor assembly, and, hence, the use of larger, more sensitive spheres is prohibited. Moreover, the sensor employs a high-rate spring to force engagement of these adjacent spheres, as the low slip coefficient of friction incident to the metal-to-metal sphere contact requires greater normal force in order to produce adequate proportional rotational response of the driven sphere in relation to the driving sphere. The use of a high-rate spring additionally produces greater frictional contact between the spheres and their bearing surfaces, producing a greater resistance to rotation, thereby reducing transducer sensitivity. The introduction of foreign particulate into the transducer environment exacerbates this frictional contact, as the surface of the driving sphere will carry the particles inside the transducer assembly, causing seizing of the assembly and reducing transducer sensitivity, reliability and responsiveness.

The "234" patent teaches an assembly comprising a light source, a light detector and a movable vane or shutter placed between the light source and light detector, with the vane's position varying proportionately with the amount of workpiece displacement. However, this "shutter technique" cannot accommodate a spherical rotatable member having a continuous, nonperforated surface, and is therefore not suitable for applications requiring the sensing of planar, as opposed to linear, slip in the absence of a second, orthogonally-oriented linear slip sensor.

SUMMARY OF THE INVENTION

It is the purpose of this invention to provide a single transducer for a robot manipulator grip whereby planar workpiece movement relative to the gripping surface may be detected, the transducer being small, lightweight, and highly sensitive, responsive and reliable.

Another purpose of the invention is to provide a transducer that is recalibrated by operation of a remote switching element so that, upon stabilization of the workpiece within the manipulator grip, the operator may reset the sensor to allow for the signaling of any additional workpiece movement.

The invention accomplishes these purposes by means of improvements in both transducer structure and in the means employed to detect workpiece movement relative to the grip surface. Specifically, the transducer of the instant invention is a sensor assembly comprising a spherical rotatable member having a modeled surface pattern of varying reflectiveness, a bushing to provide for free-floating containment of the spherical member, low-rate resilient biasing means to maintain the requisite frictional contact between the spherical member and the workpiece, a light source, a light detector, a comparator to monitor changes in the amount of light received by the light detector, and signaling means, whereby the operator may be alerted to the workpiece slippage.

The light beam produced by the light source is reflected off of the modeled surface of the spherical member. The light detector is placed so that the reflected light beam falls upon the detector's photosensitive surface. The detector thereby generates an output, the magnitude of which varies with the pattern and intensity of the reflected light beam. As the spherical member is rotated by workpiece movement, the light beam strikes an area on the surface of the sphere having a different reflective characteristic, producing a change in the pattern and/or intensity of the light beam reaching the detector. This in turn produces a change in the magnitude of the output of the detector. Comparator means is used to sample the output of the detector. When a change in the output occurs, workpiece slippage is indicated, and the comparator triggers a visual and/or audible warning signal to the operator. The signal may also be fed into an automatic control system to effect an instantaneous increase in grip pressure, thereby preventing further workpiece slippage.

A remote switching element allows the operator or automatic control system to re-enable the sensor and to establish the time at which the reference used by the comparator is measured. A timing device may be used to automatically set the reference value after a specified interval subsequent to manipulator grip clamping movement.

The reduced assembly size allows for placement of the sensor into smaller, lighter manipulator grips physically incapable of receiving the larger, heavier sensors embodying the prior art. By reducing the number of elements, the overall size and weight of the transducer assembly is reduced, even where a larger diameter spherical member is employed. The use of a larger spherical member provides greater transducer sensitivity, as a larger modeled surface produces a more narrow, brighter beam of reflected light. The sensitivity is further increased through the use of low-rate resilient biasing means to force engagement between the spherical member and the workpiece, whereby the frictional resistance to rotation produced by sphere-bushing contact is reduced, promoting a truer free-spinning condition. The use of a hollow spherical rotatable member allows for greater transducer responsiveness due to the sphere's lower inertial mass.

The elimination of full bearing contacts in favor of a cylindrical bushing allowing for free movement along the line normal to the manipulator grip surface greatly reduces the likelihood of seizing of the assembly upon introduction of foreign particulate into the sensor environment. Moreover, transducer response is not adversely affected by the adherence of foreign particles to the reflecting surface of the sphere, as it is the change in reflectivity produced by sphere rotation, rather than any given value of reflectivity, that triggers the warning. The use of reflected light allows for greater flexibility in choosing the mounting locations of the light source and light detector elements, as well as for less stringent alignment requirements during installation since the sensor will work notwithstanding slight misalignment of these elements. Additionally, the reliability of a transducer employing this sensing technique is increased as the sensor components are not readily thrown from workable alignment when place in actual service.

DETAILED DESCRIPTION OF THE PREFERRED EMBODIMENT OF THE INVENTION

Figure 1:
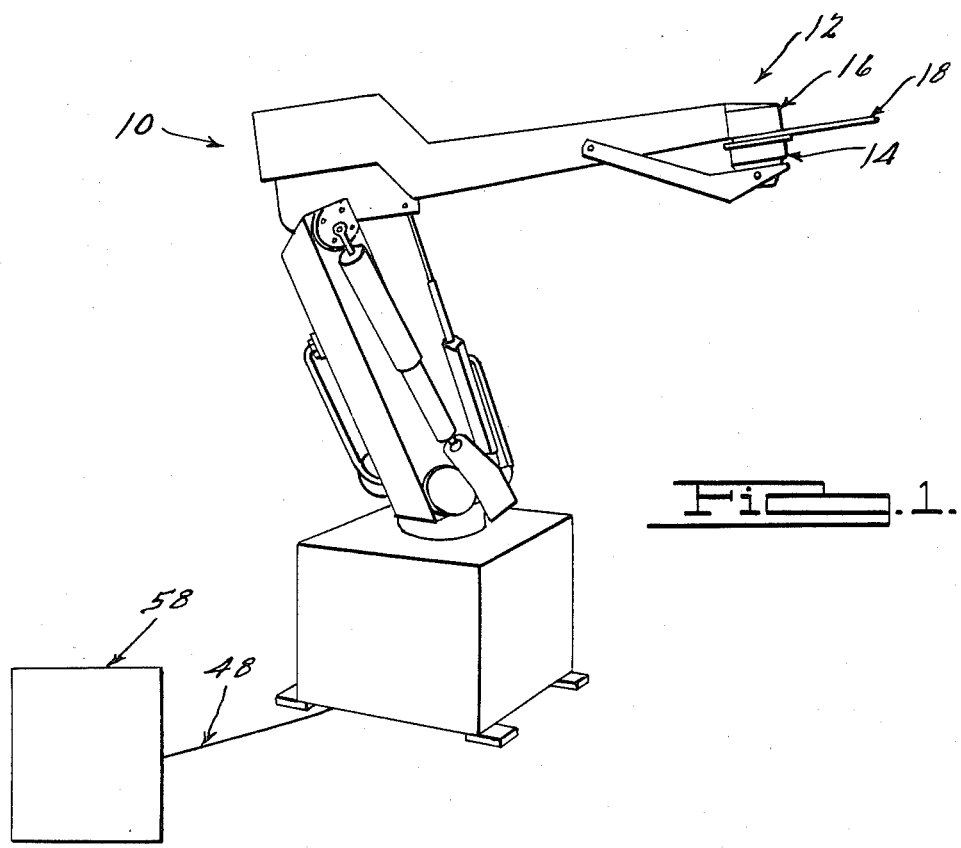
FIG. 1 is a side view in perspective of a robot device having a manipulator grip containing a slip sensor constructed in accordance with the invention.
Figure 2:
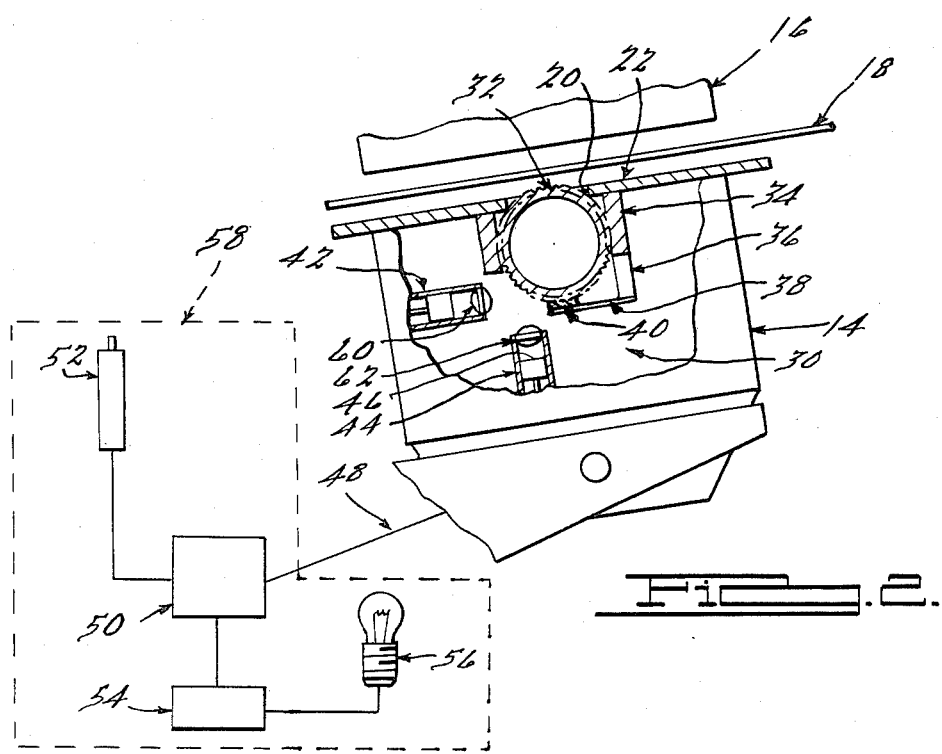
FIG. 2 is an enlarged view, partly cut out, partly in section, of the lower jaw of the manipulator grip.

FIG. 1 shows a robot device 10 having an articulated manipulator grip 12 comprising a lower jaw 14 and an upper jaw 16. A workpiece 18 is shown clamped between the lower jaw 14 and the upper jaw 16. An enlarged view of the lower jaw 14 is illustrated in FIG. 2. The lower jaw 14 houses a slip sensor assembly 30 constructed in accordance with the instant invention. A circular aperture 20 is formed in the grip surface 22 of the lower jaw 14 to accept the slight protuberance of a hollow thin-walled spherical rotatable member 32, such that the spherical member 32 may frictionally engage with the workpiece 18 clamped between the lower jaw 14 and the upper jaw 16. The hollow thin-walled spherical member 32, having a diameter slightly greater than that of the circular aperture 20, is provided with a modeled surface pattern of continuously varying reflectivity by such means as etching, rolling, painting or cutting.

A cylindrical bushing 34, characteristically formed of a polymeric substance, is affixed by conventional means to the underside of the grip surface 22 of the lower jaw 14. The cylindrical bushing 34 allows for the containment of the spherical member 32 in the plane parallel to that of the grip surface 22 while providing freedom of movement of the spherical member 32 along the line normal to the plane of the grip surface 22. An elongated rigid member 36 is attached to the cylindrical bushing 34 at the end opposite that which is attached to the underside of the grip surface 22, with the free end of the elongated rigid member 36 extending in the direction normal to and away from the plane of the grip surface 22. An elongated resilient biasing member 38 is orthogonally attached to the free end of the elongated rigid member 36 so as to extend radially inward across the end of the cylindrical bushing 34. A low friction shell 40 having a concave inner surface defined by a radius equal to that of the spherical member 32 is attached to the radially inward end of the elongated resilient biasing member 38 so as to accept the spherical member 32.

The diameter of the spherical member 32, and the length of the cylindrical bushing 34 and the elongated rigid member 36, re such that the spherical member 32 protrudes beyond the grip surface 22 when the elongated resilient biasing member 38 is in an unloaded state. The circular aperture 20 acts as a retainer so as to prevent the spherical member 32 from falling through the grip surface 22 and free of the sensor assembly 30.

A light source 42, herein disposed of as a light emitting diode (LED), is mounted within the lower jaw 14 so as to project its light beam onto the reflective surface of the spherical member 32. A light detector 44, herein disposed of as a photocell of conventional design, is also mounted within the lower jaw 14 so as to be placed generally in the path of the reflected light beam, with the light beam striking the photosensitive surface 46 of the photocell 44. A lens 60 may be employed to focus the light beam generated by the LED 42 onto the surface of the spherical member 32. Similarly, a second lens 62 may be employed to collect the reflected light beam for use by the photocell 44.

As shown schematically in FIG. 1, the lead wires 48 from the photocell 44 are connected to a remotely positioned control unit 58. FIG. 2 schematically shows the control unit 58 comprising a comparator 50 of conventional design; a remote switching element 52, herein disposed of as a momentary-on push button; a power output amplifier 54; and a signaling device 56, herein disposed of as a signal lamp.

The photocell 44 generates a potential proportional to the pattern and intensity of the light beam striking its photosensitive surface 46. The potential is carried by the lead wires 48 to the comparator 50, which compares the potential instantaneously generated by the light detector 44 with a reference value, the reference value being the potential generated at the moment of last activation of the push button 52. When the value of the instantaneous potential differs from the reference value, the comparator 50 generates a second potential which, after amplification by the power output amplifier 54, activates the signal lamp 56.

As the workpiece 18 is clamped between the lower jaw 14 and the upper jaw 16 of the manipulator grip 12, the workpiece 18 is first brought into engagement with the spherical member 32, and then with the grip surface 22. The spherical member 32 is displaced back through the circular aperture 20, deflecting the elongated resilient biasing member 38 away from the grip surface 22. The deflected elongated resilient biasing member 38 exerts a reactionary force back against the spherical member 32 as transmitted through the low-friction shell 40, so as to maintain sufficient frictional contact between the spherical member 32 and the workpiece 18. The operator depresses the push button 52 subsequent to the clamping movement of the manipulator jaws 14 and 16, thereby setting the initial reference value to be used by the comparator 50.

The movement of the workpiece 18 relative to the grip surface 22 of the lower jaw 14 produces a rotation of the spherical member 32. As the spherical member 32 rotates, the light beam generated by the LED 42 falls upon a different area on the surface of the spherical member 32, producing a different pattern and intensity of reflected light striking the photosensitive surface 46 of the photocell 44. The potential generated by the photocell 44 therefore differs from the reference value, and the comparator 50 generates a second output potential which, after amplification by the power output amplifier 54, activates the signal lamp 56. The operator is thereby alerted of workpiece slippage, and may increase the grip pressure to prevent further movement of the workpiece 18 relative to the grip surface 22. The operator depresses the push button 52 to reset the reference value used by the comparator 50 and re-enable the sensor.

It is to be noted that the invention contemplates the use of fiber optics to effect a further reduction in the size and weight of the transducer assembly while increasing its reliability. For example, optical fibers may be substituted for the wires 48, with the LED 42 and the photocell 44 being placed within the control unit 58. The effects of electromagnetic interference on the system are thereby reduced; any electromagnetic interference produced by the wires themselves is eliminated; and there is no longer the possible safety hazard of a broken wire generating a spark. Additionally, such use of fiber optics allows for the common management of many serially-linked slip sensors, as where the light output of one sensor becomes the light input of the next sensor. Purely optical comparator means may also be employed in conjunction with the use of fiber optics.

The invention additionally contemplates the use of an automatic control system to automate one or more of the following operations: initiating clamping movement of the manipulator grip jaws; activating the remote switching element, whereby the initial comparator reference value is determined; incorporating internal signaling means whereby the output of the comparator means triggers the application of additional grip pressure; and resetting the sensor upon the application of additional grip pressure.

While the preferred embodiment of the invention has been disclosed, it should be appreciated that the invention is susceptible of modification without departing from the spirit of the invention or the scope of the subjoined claims.

I claim:

1. A slip sensor for detecting movement of a workpiece relative to a grip surface of a manipulator comprising
    a spherical member having a modeled surface of randomly variable reflectivity;
    means on said manipulator for supporting said spherical member for rotation and reciprocal movement toward and away from said grip surface;
    resilient means for biasing said spherical member into engagement with said workpiece;
    a light source for projecting a light beam onto the modeled surface of said spherical member;
    a light detector positioned in the path of a light beam reflected from said spherical member, said light detector generating an output proportional to the intensity of reflected light striking said light detector;
    a comparator connected to said light detector; and
    signaling means, connected to said comparator and operable upon the occurrence of a change in the output from said light detector.

2. The slip sensor of claim 1 wherein said rotatable member comprises a hollow sphere.

3. A slip sensor comprising
    a spherical rotatable member having a modeled surface of continuously variable reflectivity for frictional engagement with a workpiece clamped between a plurality of robot manipulator grip surfaces;
    a bushing affixed to one of said manipulator grips supporting said spherical member for movement along the line normal to the surface of said manipulator grip;
    resilient means for biasing said spherical member into engagement with the workpiece;
    a light source for producing a light beam reflected off of the modeled surface of said spherical member;
    a light detector positioned generally in the path of said reflected light beam, said light detector generating an electrical signal proportional to the pattern and intensity of the reflected light beam striking said light detector;
    remote switching means;
    signaling means for indicating workpiece slippage;
    power output amplifier means for activating said signaling means; and
    comparator means for receiving the electrical signal generated by said light detector and for comparing said electrical signal to a reference value, said reference value being equal to the electrical signal at the moment of activation of said remote switching element, deviation of the sensed electrical signal from said reference value generating a second electrical signal potential sufficient to cause said power output amplifier means to activate said signaling means.

4. The slip sensor of claim 3 including a hollow spherical rotatable member.

* * * * *